July 21, 1931. G. GODDU 1,815,295
MACHINE FOR INSERTING FASTENINGS
Filed July 29, 1927 6 Sheets-Sheet 1

INVENTOR.
George Goddu

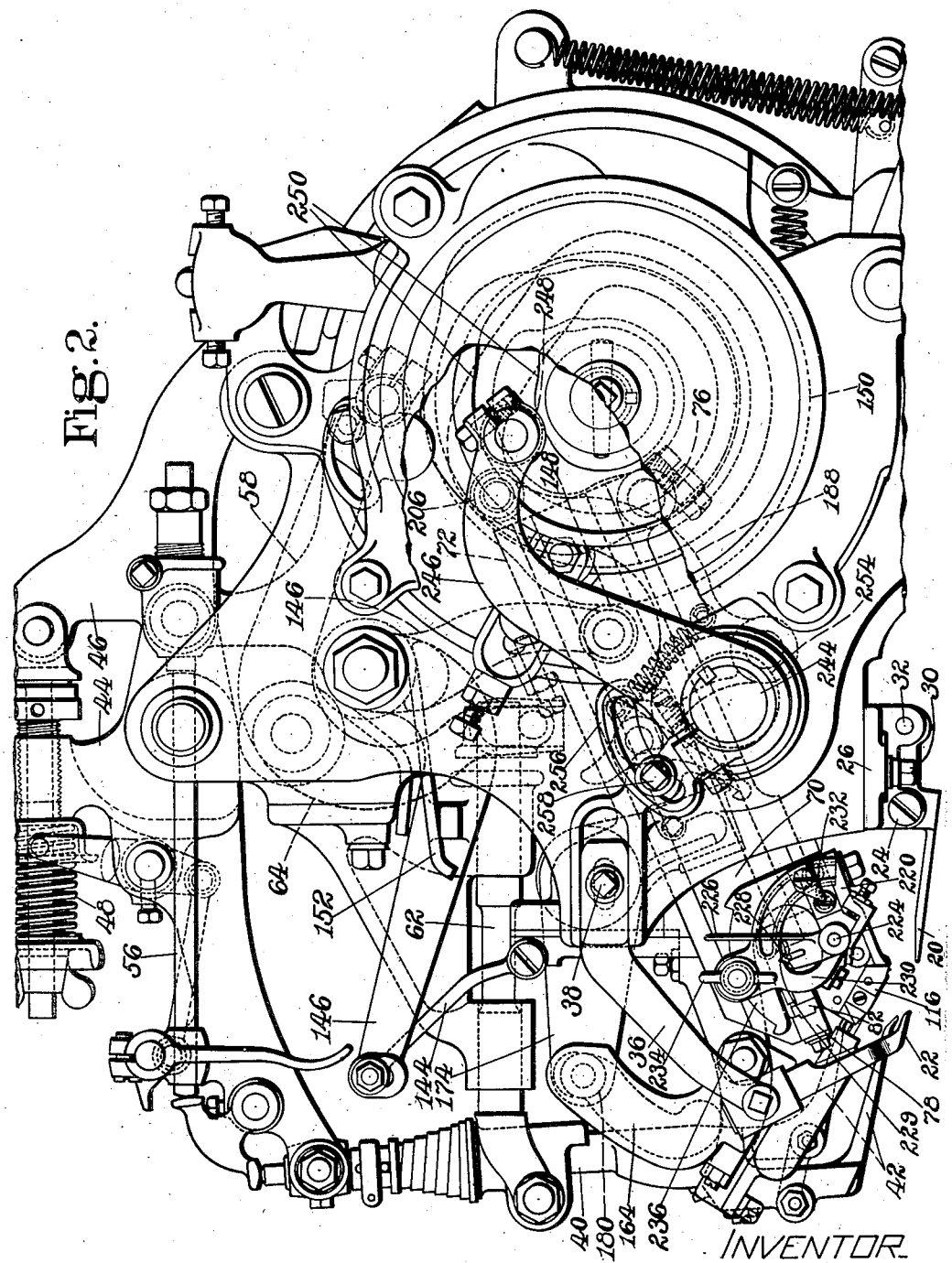

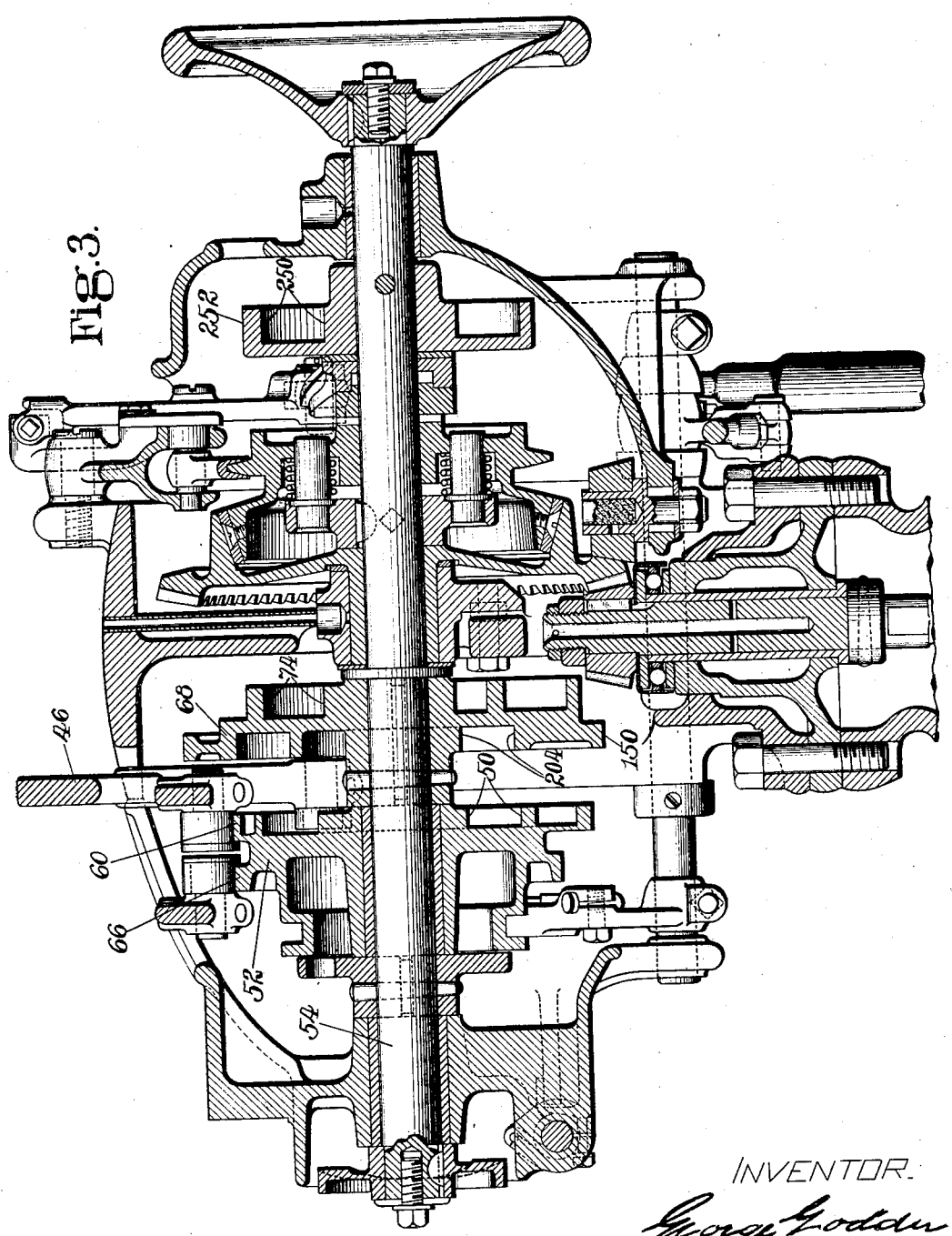

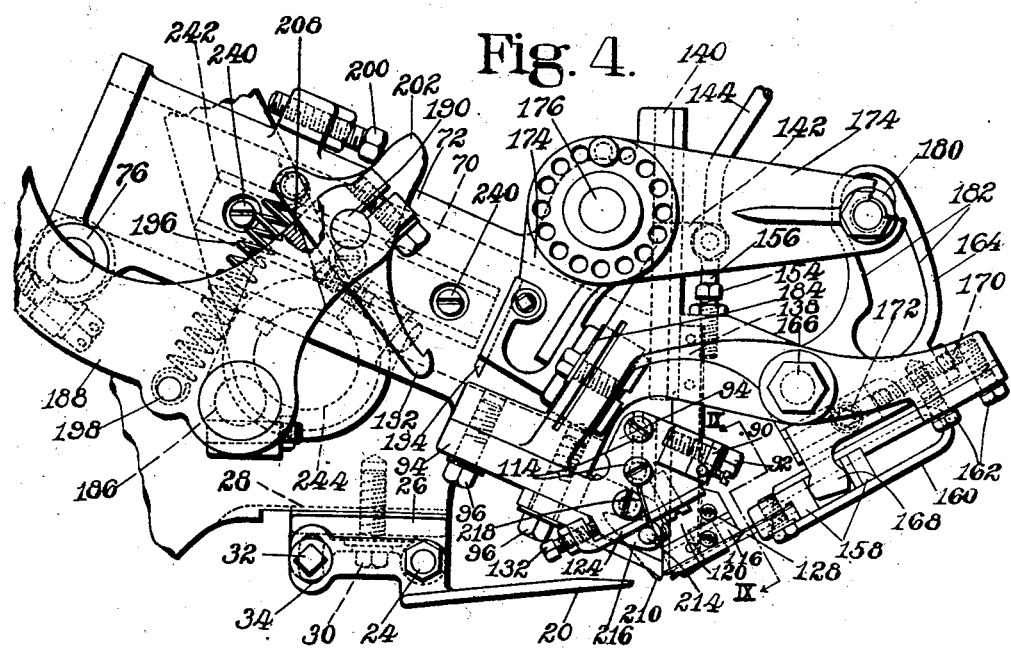
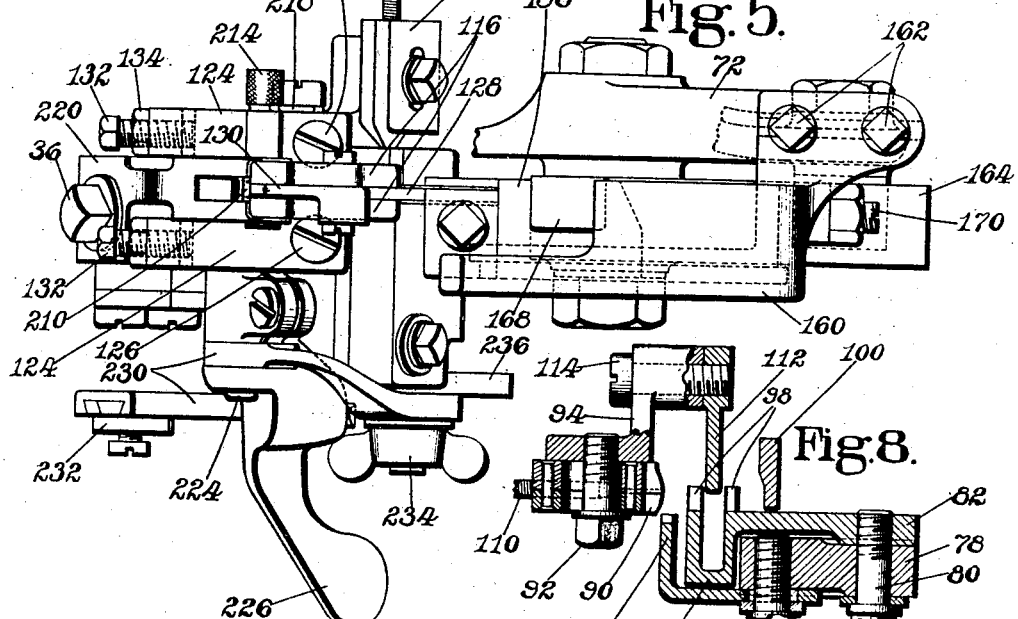

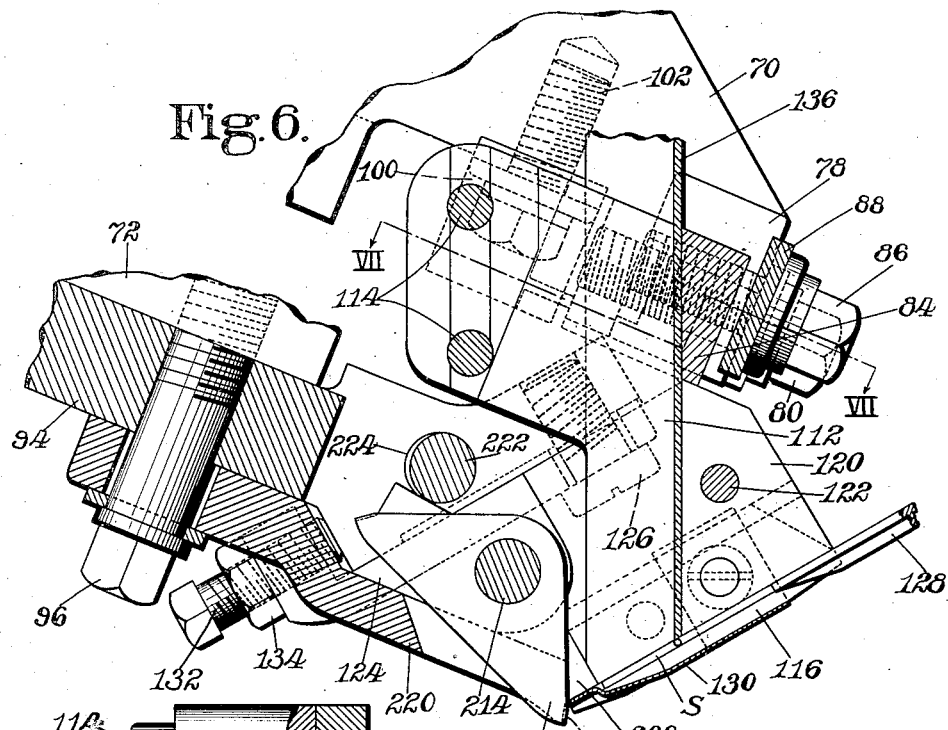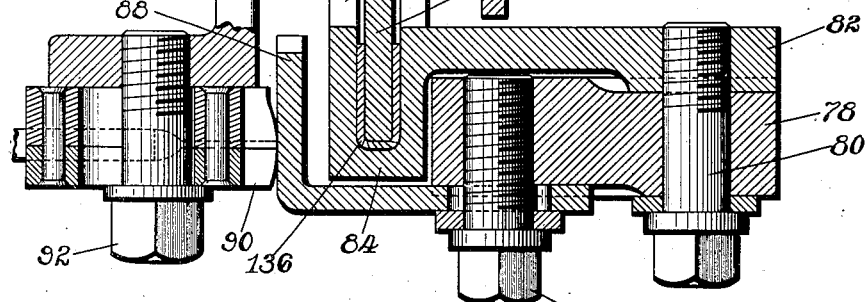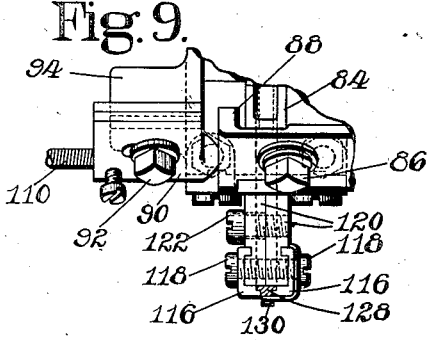

July 21, 1931.  G. GODDU  1,815,295
MACHINE FOR INSERTING FASTENINGS
Filed July 29, 1927  6 Sheets-Sheet 6
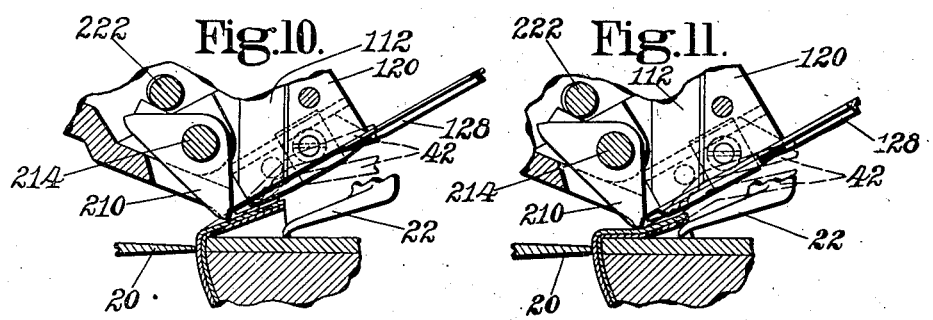
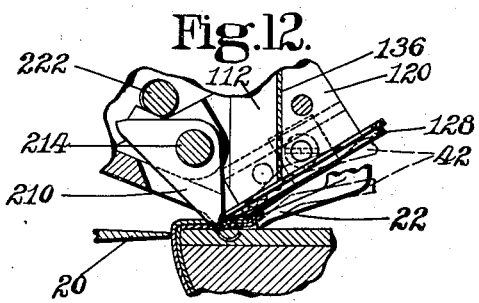
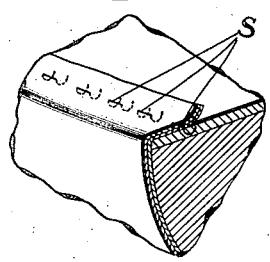
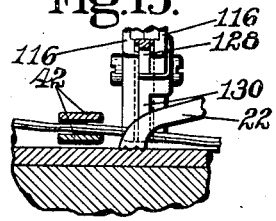
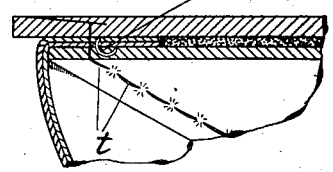
INVENTOR
George Goddu Patented July 21, 1931

1,815,295

UNITED STATES PATENT OFFICE

GEORGE GODDU, OF WINCHESTER, MASSACHUSETTS, ASSIGNOR TO THE UNITED SHOE MACHINERY CORPORATION, OF PATERSON, NEW JERSEY, A CORPORATION OF NEW JERSEY

MACHINE FOR INSERTING FASTENINGS

Application filed July 29, 1927. Serial No. 209,299.

This invention relates to machines for inserting fastenings, and in some of its novel aspects has more particular relation to means for fastening an upper to an insole before the outsole is applied to the shoe. The invention is herein illustrated by reference to the manufacture of shoes of that type in which the outsole is secured to the insole by through-and-through stitches, i. e., stitches that, at least at the time of their insertion, extend to the inside of the shoe. It is to be understood, however, that in its more general aspects the invention is not limited in utility to the manufacture of shoes of that particular type.

In Letters Patent No. 1,742,500, granted upon my application on January 7, 1930, I disclosed and claimed novel means for use in the manufacture of shoes of the above-mentioned or other type, whereby the upper was secured in lasted relation to the insole through the use of fastenings, for example staples, so applied as to anchor them by curvature within the body of the insole, instead of by clinching them on any surface of the work. More particularly, in accordance with that disclosure, the legs of the staple were deflected laterally of the cross-bar in the driving operation, by engaging them at the same side of the work from which the staple was driven, to cause them to follow curved paths in the insole. The present invention provides means whereby fastenings, anchored, for example, in the same general manner as disclosed in the above-mentioned Letters Patent, are applied in such relation to the shoe as to afford increased insurance that the upper will be held securely in lasted relation to the insole. As herein illustrated, each upper-securing staple. driven with its cross-bar extending lengthwise of the edge of the insole, has its legs deflected or curved inwardly away from said edge to anchor them. When the staples are applied in this manner, the pull of the lasted upper thereon, in a direction outwardly toward the edge of the insole, tends to turn them about the axis of curvature of their legs in the same direction in which the legs were deflected in the insole, which contributes materially to the security of their hold upon the upper. Preferably each fastening or staple is driven, as herein shown, by force applied in a direction inclined outwardly toward the edge of the insole, or toward that side of the shoe adjacent to which the fastening is located, and by its inward deflection is curved reversely toward the outer or bottom face of the insole. While the invention is herein illustrated in its application to a machine for lasting shoes, it is to be understood that it is not limited to means for fastening the upper in the manner disclosed as a part of the lasting operation.

Machines of the type illustrated require that the shoe be held by the operator and presented by him in position to receive each fastening. For operating on work such as herein shown, in which the fastening is driven through the upper into the plane bottom face of the insole, the machine is provided with a shoe bottom rest, or sole rest, which engages the insole in a location farther inwardly from the edge of the shoe bottom than the location where the fastening is driven into the shoe and against which the operator presses the shoe and holds it for the reception of the fastening. While the shoe is thus presented, the fastening means is moved a fixed distance inwardly over the shoe bottom, as herein illustrated in a path inclined downwardly toward the bottom face of the insole to lay the upper over said face, and then drives the fastening. It is desirable that before the fastening is driven the fastening means be located close to the insole and be pressed firmly against the upper, in order that fastening shall be fully driven and securely anchored in the insole. This has required heretofore that the operator exercise much care in presenting the shoe, lest it be tipped relatively to the sole rest to such a position that the fastening means at the end of its movement over the shoe would not be close enough to the shoe bottom for the best results in the fastening operation. The present invention provides an organization such as to relieve the operator of the necessity of exercising a high degree of care in this respect and practically to insure a proper relation between the fastening means and the shoe when the fastening is driven. As herein illustrated there is provided means for imparting to the fastening mechanism, after its movement inwardly over the shoe bottom, an additional movement in a different direction toward the bottom face of the insole immediately before the driving of the fastening. By this movement, in the construction shown, the staple deflector is pressed down firmly against the upper, and insurance is afforded that the staple will be fully driven and securely anchored in the insole. While this feature of the invention is thus illustrated in its application to the driving of upper-securing fastenings in the bottoms of shoes, it is considered that in its more general aspects it is not thus limited but is of wider utility as applied to the driving of fastenings in other kinds of work.

Further features of the invention relate to novel details of the fastening mechanism. One of these features comprises novel means for operating the driver, the construction shown including a pair of levers, one of which is provided with a roll operating in a cam slot in the other, for imparting to the driver movement in the required relation to the shoe, this arrangement being particularly useful where the driver moves, as illustrated, in a direction inclined toward the rear of the machine. The fastening mechanism, as heretofore in machines of the type illustrated, comprises means for forming each staple in a location out of alinement with the driver and for transferring it into position to be driven; and another feature consists in a novel construction and arrangement of forming means and transferring means. As herein shown, the staple is formed with its legs directed rearwardly, preparatory to the operation of the rearwardly movable driver thereon, by movement of an inside former relatively to an outside former as the fastening mechanism is moved forwardly over the work, and the staple is transferred downwardly to driving position by a separate member while guided by an extension of the inside former. Still another feature comprises novel means for insuring that the fastening will not be deflected in a wrong direction in the driving operation.

The invention further provides novel means for varying the curvature by which the fastenings are anchored in the work. As explained in Letters Patent No. 1,776,428, granted upon an application of mine on September 23, 1930, it is sometime desirable that the fastenings be differently curved in different portions of a shoe, by reason of variations in the thickness of the upper materials, and in said Letters Patent there was disclosed novel means by which such a variation in the curvature could be conveniently and quickly effected in operating on each shoe. There may be also a substantial variation in the thickness of the upper materials as a whole in different lines of shoes, and the present invention accordingly provides additional means whereby an adjustment of the curvature of the fastenings may be conveniently made to meet that condition. The construction herein shown is such that the last-mentioned adjustment may be made without affecting a previous adjustment whereby the ratio between the degrees of curvature of fastenings in different portions of the same shoe is predetermined.

The invention in its various novel aspects will now be more particularly described by reference to the accompanying drawings and thereafter pointed out in the claims.

In the drawings,

Fig. 2 is a view of the head of the machine in right-hand side elevation;

Fig. 3 is a vertical section in a plane parallel to the front of the machine;

Fig. 4 is a left-hand side elevation of a portion of the upper-fastening mechanism;

Fig. 5 is an inverted plan view of the right-hand portion of the structure shown in Fig. 4, on an enlarged scale;

Fig. 6 is a view of a portion of the fastening mechanism in vertical section;

Fig. 7 is a section on the line VII—VII of Fig. 6;

Fig. 8 is a view similar to Fig. 7, on a smaller scale, showing the parts differently positioned;

Fig. 9 is a section on the line IX—IX of Fig. 4;

Figs. 10, 11 and 12 are detail views showing the positions of the upper-pulling and fastening instrumentalities at different times in operating on a shoe;

Fig. 13 is a view at a different angle illustrating more clearly the relation between the upper-pulling means and the fastening means;

Fig. 14 is a perspective view of a portion of a lasted shoe the upper of which has been fastened to the insole by the means provided by this invention; and Fig. 15 is a sectional view of a completed shoe of the through-and-through sewed type, illustrating the relation of the upper-fastening staples to the outsole stitches.

Figure 1:
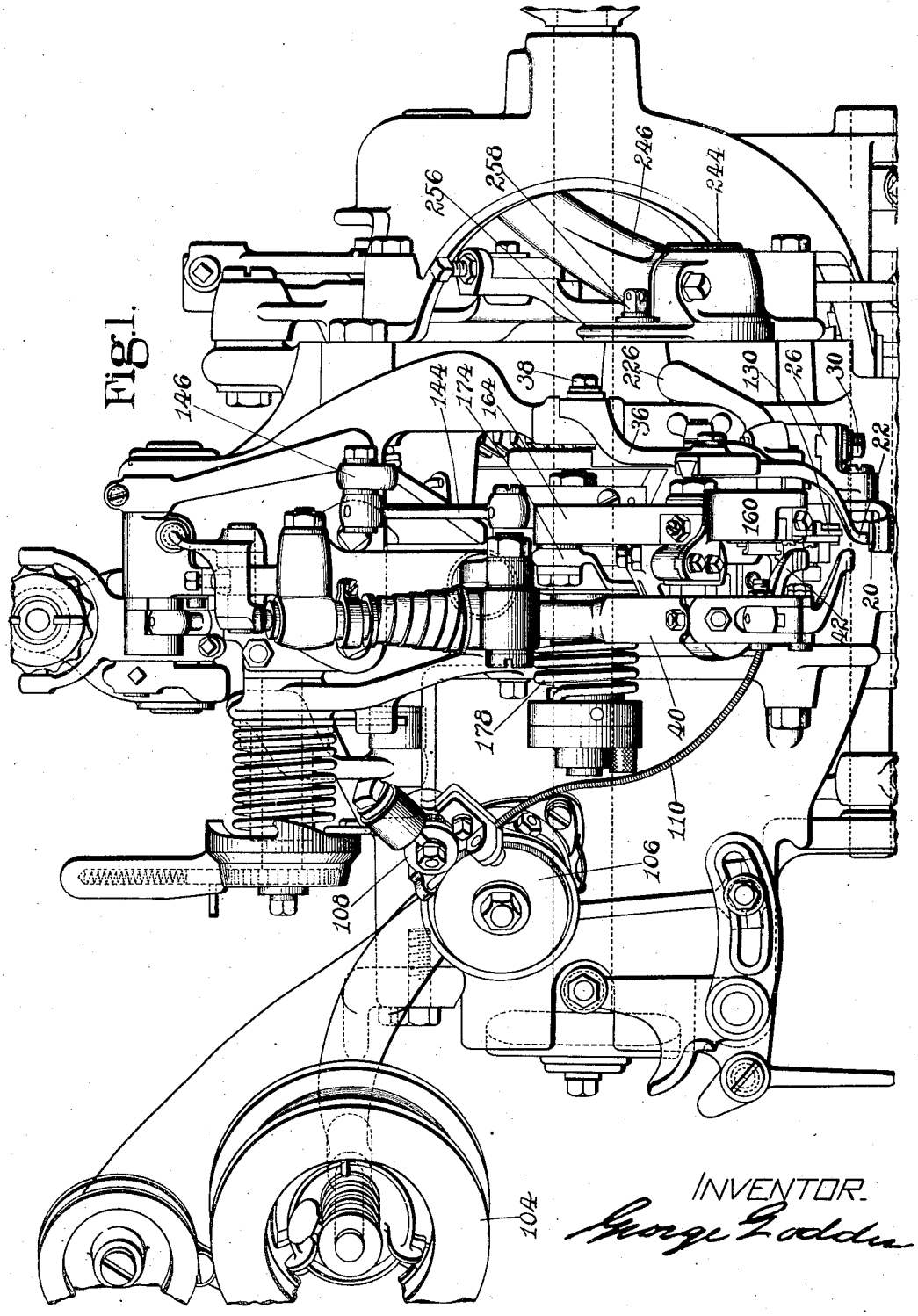
Fig. 1 is a view in front elevation of the head portion of a machine in which novel features of the invention are embodied.

The machine herein shown, except for the construction of portions of the upper-fastening means and the shoe-positioning means, is similar in its general organization to the machine shown and described in Letters Patent No. 1,796,451, granted upon an application of mine on March 17, 1931, and accordingly such features as are common to the disclosure of said Letters Patent need be described herein only in brief terms.

To assist the operator in positioning for the operation of the machine shoes of that type in which the upper is fastened in lasted position to the plane bottom face of the insole, there are provided an edge rest 20 for engaging the side of the shoe near the edge of the shoe bottom and a sole rest 22 for engaging the bottom face of the insole at a considerable distance from the edge of the shoe bottom. The edge rest 20 is pivotally mounted at 24 on a bracket 26 which is adjustable along a guideway 28 (Fig. 4) formed in the head of the machine to vary the position of the shoe laterally and thereby to determine the distance from the edge of the shoe bottom at which the fastenings are driven, the bracket 26 being held in adjusted position by a cap-screw 30. The edge rest 20 may also be adjusted in a vertical plane about its pivot 24 on the bracket 26, to vary the height of its shoe-engaging end, and it is held in adjusted position by a cap-screw 32 which is threaded in the bracket 26 and extends through a slot 34 formed in a rearward extension of the edge rest member. The sole rest 22 may be adjusted upwardly or downwardly in a bracket 36 (Fig. 2) by which it is supported, and this bracket is adjustable horizontally in a guideway formed in the head of the machine to vary the distance from the edge of the shoe bottom at which the sole rest engages the shoe, the bracket being held in adjusted position by a cap-screw 38.

For pulling the upper heightwise of the last and inwardly over the insole there is provided a gripper 40 the construction of which, and likewise that of its operating mechanism, are substantially like what is disclosed in Letters Patent No. 1,796,451. The gripper is provided with a pair of jaws 42 which in the construction herein shown are curved laterally, as shown in Fig. 1, to permit the remainder of the gripper to be offset lengthwise of the edge of the shoe bottom relatively to the upper-fastening means and thereby to afford room for the novel upper-fastening mechanism provided by this invention. It will further be observed that the upper-gripping ends of the jaws 42 are somewhat displaced lengthwise of the edge of the shoe bottom from the insole-engaging end of the sole rest 22. Preferably, as shown, that gripper jaw which engages the lining side of the upper has a smooth face, while the other jaw has a toothed face, so that under some conditions the lining-engaging jaw may slip on the lining and thereby prevent the lining from limiting the stretching of the upper leather. As more fully described in the last-mentioned Letters Patent, the gripper is operated to pull the upper heightwise of the last by a two-part updraw lever 44, 46, the parts of which are yieldingly connected by a spring 48, this lever being operated by a path cam 50 formed in one side of a cam wheel 52 on a cam shaft 54 (Fig. 3). The gripper jaws 42 are closed by means including a push rod 56 which is operated by a lever 58 from a peripheral cam 60 on the cam wheel 52. In addition to its updraw movement the gripper 40 receives overdraw movement to pull the upper inwardly over the bottom of the insole from an overdraw rod 62 which is operated by a lever 64 from a cam 66 on the cam wheel 52.

The means for operating and controlling the cam shaft 54 need not be described herein in detail, since it is substantially the same as the means fully described in the Letters Patent last mentioned. This cam shaft has fast thereon a cam wheel 68 for operating the upper-fastening mechanism hereinafter described. The cam wheel 52, which carries the cams for operating and controlling the gripper as above described, is not fast on the cam shaft 54, but is so mounted and controlled that it may be connected to the cam shaft or held stationary during the operation of the cam shaft, at the will of the operator, so that the machine may, if desired, be used solely as a stapling machine without pulling the upper. In these respects also the machine is substantially like that disclosed in said Letters Patent and details of the means for controlling the cam wheel 52 are accordingly not described herein.

The upper-fastening mechanism, including means for forming staples above the line of drive and for transferring them into alinement with the staple driver, is for the most part movable bodily toward and from the shoe in directions inclined to the bottom face of the insole and in the machine herein shown serves in its movement toward the shoe as means for laying the margin of the upper over the insole into position to be fastened. Supported on the head of the machine in a manner hereinafter described is a member 70 which is so formed as to provide a forwardly and downwardly inclined guideway for a movable slide 72 (Fig. 4), this slide having mounted thereon the staple-transferring, driving and deflecting mechanisms and a portion of the staple-forming mechanism. For moving the slide 72 along its guideway toward and from the shoe, there is formed in one side of the cam wheel 68 (Fig. 3) a path cam 74 which engages a roll 76 (Figs. 2 and 4) on the slide.

Secured to a bracket 78 integral with the front end portion of the member 70, by means of a cap-screw 80, is a plate 82 which is shaped at its left-hand end (Figs. 7 and 8) to provide an outside former 84 for forming the staples. Secured also adjustably on the bracket 78, by a cap-screw 86, is an angular plate 88 which serves as a shearing member for severing from a strand of staple wire a section of the proper length for a staple. Co-operating with the shearing plate 88 is a wire-guiding nozzle 90 comprising two plates which are clamped together and are secured adjustably by a cap-screw 92 to a bracket 94, this bracket being fastened to the lower face of the front end portion of the slide 72 by screws 96 (Fig. 4). The nozzle 90 is thus moved forwardly by the slide 72, and its outlet end is positioned in such close relation to the shearing plate 88 that the wire is cut in response to such movement. When the slide 72 is in its retracted position, as illustrated in Fig. 8, the wire is fed from the nozzle 90 through guiding slots 98 in the opposite sides of the outside former 84 until its end engages a stop plate 100 secured by a screw 102 (Fig. 6) to the member 70. The wire is fed from a reel 104 (Fig. 1) by feed rolls 106, 108 which are operated by mechanism fully described in Letters Patent No. 1,796,451. From the feed rolls the wire is advanced through a flexible tube 110 to the nozzle 90. Co-operating with the outside former 84 is an inside former 112 which is secured by cap-screws 114 to the bracket 94 on the slide 72. The inside former is thus moved forwardly by the slide 72 to engage the section of wire severed by the shearing member 88 and the nozzle 90 and force it into the outside former to form a staple.

The position in which the staple is formed is considerably above the position which it occupies at the time when it is driven, and it is transferred downwardly into driving position by mechanism hereinafter described. For guiding the staple in the driving operation there is provided a nozzle comprising members 116 (Fig. 9) secured in opposed relation, by means of screws 118, to plates 120 which are fastened together side by side by a screw 122. The plates 120 are provided with flanges 124 which are fastened by screws 126 to the bracket 94 on the slide 72. The members 116 are shaped to extend inwardly under the lower edges of the plates 120 and to provide a guideway for a T-shaped staple driver 128. It will be understood by reference to Fig. 9 that the members 116 thus provide ledges in front of the staple driver upon which the legs of the staple are supported at the end of the transferring movement of the staple and in the staple-driving operation. Secured on one of the members 116 by its clamping screw 118 is an auxiliary staple-guiding member 130 which is formed of sprng metal and is so shaped as to extend upwardly into the path of the driver 128 and between the legs of the staple at the outlet end of the staple nozzle to assist in guiding the legs, the staple-guiding portion of this member extending lengthwise of the staple legs and being displaceable downwardly by the driver 128 near the end of its driving movement. The hole in one of the plates 120 through which the screw 122 extends is somewhat larger than the diameter of the screw, as shown in Fig. 9, and the holes in the flanges 124 through which the screws 126 extend are also larger than these screws, as indicated in Fig. 6. This permits a slight relative adjustment of the plates 120 with their attached nozzle members 116 lengthwise of the driver passage for a purpose which will be hereinafter explained. Screws 132 are threaded in upturned portions of the flanges 124 and abut against the bracket 94 to assist in effecting this adjustment, the screws being held in place by lock nuts 134.

For transferring each staple downwardly from forming position to driving positon, there is provided a transferring member 136 which is shaped to embrace the inside former 112, as shown in Fig. 7, and is moved forwardly with the inside former in the staple-forming operation. The transferring member 136 is fastened at its upper end to a slide 138 (Fig. 4) which is vertically movable in a guideway 140 formed in the slide 72. An ear 142 on the slide 138 is connected by a link 144 to one arm of a bell-crank lever 146 (Fig. 2) the other arm of which is provided with a roll 148 engaged by a peripheral cam 150 on the cam wheel 68. A spring 152 acts on the lever 146, when permitted by the cam 150, to impart staple-transferring movement yieldingly to the member 136, and the cam acts to return the member thereafter to its starting position in which its lower end face is above the position in which the staple is formed. For limiting the downward movement of the transferring member there is provided a stop screw 154 threaded in a forward extension of the slide 72, the head of which is engaged by a lug 156 extending downwardly from the ear 142 of the slide 138. It will be understood that in its transferring movement the member 136 is guided between the inside former 112 and the outside former 84. For guiding the staple during its transfer the inside former 112 is extended downwardly as far as the path of the driver 128, and the plates 120 of the staple nozzle are recessed to provide walls in line with the walls of the outside former to co-operate with the downward extension of the inside former in providing a guideway for the staple. It will be evident that when the staple is formed it lies in a plane parallel to the direction of movement of the slide 72 and that when it is driven it lies in a differently inclined plane parallel to the path of movement of the driver 128, and the lower end of the transferring member 136 is so shaped as to tip the staple and position it in proper relation to the path of the movement of the driver at the end of the transferring operation. It will be further understood that the lower end of the transferring member co-operates with the ledges formed on the nozzle members 116 to guide the legs of the staple in the driving operation.

The staple driver 128 is secured to a driver slide 158 (Fig. 4) which is movable in a guideway formed in a bracket 160 secured by screws 162 to a forward extension of the slide 72. The driver slide 158 is operated by a lever 164 which is pivoted on a stud 166 on the forward extension of the slide 72 and is provided at its lower end with a block 168 which is swiveled in a recess in the driver slide. The block 168 is adjustable in a guideway formed in the lever 164 to determine the position of the driver at the end of its driving movement, the adjustment being effected by a screw 170 in the lever 164 and the block being held in adjusted position by a screw 172. For imparting operative movement to the lever 164 there is provided a bell-crank lever 174 which is pivotally mounted on a stud 176 on the slide 72 and is operated by a torsion spring 178 (Fig. 1). Means similar to that disclosed in Letters Patent No. 1,796,451 is provided for adjusting the tension of the spring 178. A forwardly extending arm of the bell-crank lever 174 carries a roll 180 which lies in a cam slot 182 formed in the lever 164. The cam slot 182 is so formed that staple-driving movement is imparted to the lever 164 by upward movement of the forwardly extending arm of the bell-crank lever 174, and driver-retracting movement is imparted to the lever by downward movement of the arm. The cam slot 182 at its opposite ends is provided with portions which are concentric with the axis of movement of the lever 174 when the roll 180 is positioned in the respective end portions of the slot, so that the position of the driver 128 at the end of its movement in either direction may be accurately determined by the adjustment of the block 168 irrespective of such small variations as there may be in the extent of the movement of the lever 174. The operative movement of the lever 174 under the force of the spring 178 is limited by a fiber disk 184 adjustably secured in a recess in the slide 72 in position to be engaged by a downwardly extending arm of the lever.

For imparting swinging movement to the bell-crank lever 174 against the resistance of its spring 178 to retract the driver 128 preparatory to the staple-driving operation, there is pivoted at 186 (Fig. 4) on the head of the machine a lever 188 on which is pivotally mounted at 190 a latch 192 for engaging the lower end of a plate 194 fast on the downwardly extending arm of the lever 174. A spring 196 connected at one end to the latch 192 and at its other end to a pin 198 on the lever 188 holds the latch in engagement with the plate 194 when the slide 72 and the parts carried thereby are in their initial retracted positions. When the slide 72 is moved forwardly toward the shoe, the latch 192 acts to swing the bell-crank lever 174 against the resistance of its spring in response to such forward movement, thereby retracting the staple driver as the latter is being carried bodily forward with the slide. For operating the latch 192 to release the lever 174 for the staple-driving operation, the slide 72 carries an adjustable screw 200 the head of which is arranged to engage a finger 202 projecting upwardly from the latch and thus to swing the latch downwardly and disengage it from the plate 194. The forward movement of the slide 72, however, does not carry the screw 200 far enough to act on the finger 202, since it is necessary to allow time for the transfer of the staple after the slide has arrived at the end of its forward movement. Release of the lever 174 is accordingly effected in response to a movement of the latch-carrying lever 188 such as to cause the screw 200 to act on the finger 202 to disconnect the latch from the plate 194, this movement of the lever 188 being effected by a path cam 204 (Fig. 3) formed in one side of the cam wheel 68 and engaging a roll 206 (Fig. 2) on the lever 188. In the return of the parts to starting position the latch 192 is engaged by a stop shoulder 208 on the lever 188 to hold it in position to connect again with the plate 194 when the slide 72 arrives at the end of its retractive movement.

For curving the legs of the staple to anchor them in the shoe there is provided a deflector 210 the lower end of which occupies a position opposite to the end of the staple-guiding passage in the nozzle members 116 for engaging the staple legs at the same side of the work from which the staple is driven, i. e., without the presence of any portion of the work between the deflector and the nozzle. The member 210 is provided with grooves 212 (Fig. 6) for guiding the staple legs in the proper paths, and is thus arranged to deflect or curve different portions of the legs successively in the driving operation in directions transverse to the plane of the staple, i. e., the plane including the legs and the cross-bar prior to deflection of the legs. It will be observed that in the construction shown the staple is driven by force applied in a direction inclined outwardly toward the edge of the insole, or toward that side of the shoe adjacent to which the staple is driven, with the cross-bar of the staple substantially parallel to the edge of the insole, and that the deflector 210 is arranged to cause the staple legs to enter the shoe in directions approximately perpendicular to the bottom face of the insole and then to follow curved paths leading back in directions substantially opposite to that of the drive, the degree of curvature of the legs being preferably such that their ends return toward the bottom face of the insole without penetrating its inner face.

The deflector 210 is supported on a pivot pin 214 mounted in lugs 216 (Fig. 4) extending downwardly from the bracket 94, the pin being held detachably in place by a spring member 218 which lies in a groove formed in the pin. The pin may thus be readily removed to permit replacement of the deflector. The deflector 210 extends downwardly through a guiding slot formed in a plate 220 (Figs. 5 and 6) which is secured on the bracket 94 by one of the screws 96.

It will be evident that the degree of curvature of the staple legs will depend upon the distance between the end of the staple nozzle, comprising the members 116, and the deflecting face of the member 210. It will also be understood that the degree of curvature which it is desirable to impart to the staple legs, in order to anchor the staple in the most effective manner, depends to some extent upon the thickness of the upper materials through which the legs must pass before entering the insole, and that the thickness of the upper materials may vary considerably at different portions of the same shoe, especially in a shoe of that type in which the counter, at one side at least, extends forwardly into the shank portion of the shoe. Furthermore, the thickness of the upper materials as a whole will sometimes vary considerably in different lines of shoes. The machine is accordingly provided with means for adjusting the deflector 210 to meet these different conditions. To this end, the deflector is mounted to turn about the pin 214, and is engaged on its upper face by an eccentric 222 formed on a shaft 224 which is mounted in bearings formed in the bracket 94. It will be understood that in accordance with the position of the eccentric 222 the distance between the deflecting face of the member 210 and the end of the staple nozzle will vary. For adjusting the eccentric 222 there is secured on the shaft 224 a lever 226. In order that the proper adjustment may be quickly effected for operating upon different portions of the same shoe, there is provided means for limiting the movements of the lever 226 in opposite directions. For determining the proper limit of movement of the lever in one direction, there is provided a spring-controlled V-shaped detent 228 (Fig. 2) which is arranged to enter a notch 229 formed in a bracket member 230, this notch thus serving as a stop, and for limiting the movement of the lever in the opposite direction there is provided a stop 232 adjustably secured in a curved guideway formed in the member 230.

In order to accommodate the staple-deflecting means also to variations in the thickness of the upper materials in different lines of shoes, the bracket member 230 which carries the means for determining different positions of the lever 226, as above described, is mounted to turn about the shaft 224, so that both the stop 232 and the notch 229 may be displaced about the axis of the shaft without affecting their relation to each other. The parts may thus be set to cause the differently curved staples used at different portions of the same shoe to have either a smaller or greater degree of curvature without altering the ratio between their curvatures. The bracket 230 is held in any position of adjustment by a clamp including a wing nut 234 in engagement with a curved member 236 fast on the bracket 94. It will be evident that adjustment of the member 230, by changing the position of the notch 229, serves to vary the degree of curvature of the staples used in one portion of a shoe, while adjustment of the stop 232 along the curved guideway in the member 230 serves to vary the degree of curvature of the staples used in other portions of the same shoe. By manipulating the member 230 and the stop 232 the curvatures of the staples used in different portions of a shoe may thus be determined as desired, while by adjusting the member 230 alone the curvatures of the staples used in both portions of a shoe may be varied simultaneously in the same degree for the purpose hereinabove explained.

It will be understood that the curvature imparted to each leg of the staple in the driving operation depends upon the distance between the end of that nozzle member 116 which controls that leg and the corresponding groove 212 in the deflector 210, and that by adjustment of the deflector in the manner above described the curvatures of both legs of the staple are varied in equal degrees. In view of the possibility of unequal wear of the deflector 210 in the different grooves 212, or of unequal wear of the different nozzle members 116, it is desirable that means be provided for varying the curvature of each leg of the staple independently of the other, and it is for this purpose that the plates 120, to which the nozzle members 116 are secured, are adjustable through the use of the screws 132 in the manner hereinbefore explained. The proper adjustment will be made in setting up the machine, and thereafter there will be no need of readjustment of these parts except at rare intervals. Any such relative adjustment of the plates 120 will be comparatively slight, and the recesses in these plates affording a passageway for the staple transfer member 112 are made large enough to permit such adjustment without interfering with the movement of this member.

It is desirable that in the staple-driving operation there be a continuous guiding wall above the staple legs between the end of the staple nozzle and the deflecting face of the member 210, in order to guard against any possibility of accidental upward deflection of the staple legs instead of deflection toward the work. The deflector 210 is accordingly provided with an extension 238 (Fig. 6) having a lower face arranged to extend over the ends of the nozzle members 116 in any position of adjustment of the deflector 210.

It will be understood that the movement of the staple-driving and deflecting means forwardly and downwardly toward the bottom of the shoe, whereby the margin of the upper is engaged and laid over the bottom face of the insole to receive the staple, is a movement of fixed extent, and that the position of the staple nozzle and the deflector 210 relatively to the bottom face of the insole, at the end of this movement, will depend upon how the operator holds the shoe in engagement with the edge gage 20 and the sole rest 22 for each lasting operation. In order to relieve the operator of the necessity of exercising special care in presenting the shoe, and to insure that, notwithstanding such variations in the lateral inclination of the shoe as are practically inevitable in presenting it successively to the lasting instrumentalities, the stapling means will be located in sufficiently close relation to the bottom face of the insole for the best results in the fastening operation, the machine is provided with means for imparting to the fastening mechanism, after it has been moved inwardly over the bottom of the shoe, a movement in a different direction toward the bottom face of the insole immediately before the staple is driven. For this purpose the member 70, which provides a guideway for the slide 72, is secured by screws 240 (Fig. 4) to a holder 242 which has a downwardly extending portion fast on a rock shaft 244 mounted in the head of the machine. Secured also on this rock shaft is a lever 246 (Figs. 1 and 2) provided with a roll 248 engaged by a path cam 250 formed in one side of a cam wheel 252 (Fig. 3) on the cam shaft 54. It will thus be seen that by the action of the cam 250 on the lever 246 the slide 72 and the fastening mechanism carried thereby are swung downwardly toward the bottom of the shoe in a direction substantially at right angles to the direction of their movement inwardly over the shoe. Regardless, therefore, of such small variations in the lateral inclination of the shoe as may occur in presenting the shoe in different positions, the staple nozzle and the deflector 210 are moved downwardly far enough to insure that the deflector will be pressed firmly against the upper materials so as to hold them securely against the insole while the staple is driven and to insure that the staple will be fully driven and securely anchored in the insole. It will be understood that after driving the staple the staple driver 128 remains at the end of its driving movement until a predetermined time in the operation of the machine upon the next shoe, and in order to prevent any possibility of loosening the staple by the engagement of the driver therewith in the retracting movement of the stapling mechanism, the cam 250 is so shaped, as illustrated in Fig. 2, as to impart to the slide 72, immediately after the staple-driving operation and prior to the retracting movement of the slide along its inclined guideway, a reverse upward swinging movement which is of somewhat greater extent than the extent of its downward swinging movement prior to the driving of the staple. Thereafter, in time relation to the retractive movement of the slide 72 effected by the cam 74, the cam 250 swings the slide back to a normal position preparatory to operations on the next shoe.

In order to provide for adjustment of the pressure applied to the head of the staple between the outside former 84 and the inside former 112, the rock shaft 244 is mounted in an eccentric bushing 254 (Fig. 2) provided with a slotted extension 256 through which extends a clamping screw 258 threaded in the head of the machine. By this means the member 70, which is supported on the rock shaft 244 and which carries the outside former 84, may be adjusted to vary the spacing between the outside former and the inside former at the end of the staple-forming movement of the inside former.

In the operation of the machine, briefly summarized, the operator presents the shoe in engagement with the edge gage 20 and with the sole rest 22 in position for the gripper jaws 42 to engage that portion of the upper upon which a lasting operation is to be performed, and then starts the machine by depressing the starting treadle. The gripper then grips the upper and pulls it heightwise of the last and inwardly over the insole in the manner more fully described in Letters Patent No. 1,796,451. In pulling the upper inwardly over the insole the gripper is positioned substantially as indicated by dotted lines in Fig. 10. While the gripper is thus holding the upper the fastening mechanism is moved forwardly or inwardly over the bottom of the shoe in a path inclined toward the bottom face of the insole by the action of the cam 74 on the slide 72, as illustrated by Figs. 10 and 11. In this movement the upper-fastening mechanism, comprising the staple nozzle and the deflector 210, engages the margin of the upper at a substantial distance above the bottom face of the insole, as shown in Fig. 10, and lays the margin of the upper upon said face, as indicated in Fig. 11. In this operation the fastening mechanism engages the upper in a location slightly displaced lengthwise of the edge of the shoe bottom from the gripper jaws 42. By the forward movement of the slide 72 a section of staple wire is severed by the action of the cutter 88 in co-operation with the nozzle 90, and the section of wire is forced by the inside former 112 into the outside former 84 to form a staple. By the same movement of the slide 72 also the staple driver 128 is retracted against the resistance of the spring 178 through the action of the latch 192 upon the bell-crank lever 174.

After the slide 72 has completed its forward movement, the staple-transferring member 136 is operated by the cam 150 to force the formed staple downwardly into the path of movement of the driver. At substantially the same time also the slide 72 is swung about the axis of the rock shaft 244 by the action of the cam 250 on the lever 246 to force the deflector 210 and the staple nozzle downwardly against the upper with increased pressure. In predetermined time relation to these operations, and preferably at or near the time when the fastening mechanism arrives in the position indicated by Fig. 11, the gripper releases its hold on the upper, and the downward movement of the nozzle and deflector insures that the upper will be firmly pressed against the insole and held against loss of tension until the staple is driven. After the deflector 210 has been pressed hard against the work by the swinging of the slide 72, the driver lever 174 is released by the latch 192 to the action of the spring 178 in response to movement of the lever 188, and the driver 128 is thereby rendered operative to drive the staple, as illustrated in Fig. 12.

It will be evident that the operative movement of the driver is in a direction inclined outwardly toward the edge of the insole, or toward the rearwardly facing side of the shoe, and generally opposite to the direction of the overdrawing pull of the gripper on the upper, and that by the action of the deflector 210 the legs of the staple are so deflected as to follow curved paths leading inwardly away from the edge of the insole, the degree of curvature preferably being such that the ends of the legs return toward the bottom face of the insole. The ends of the legs thus curved may or may not penetrate the bottom face of the insole, since in either event there is no danger that they will work up into the interior of the shoe in the wear of the shoe. After the staple has thus been driven and anchored, the slide 72 is swung upwardly to insure that the end of the driver 128 will not catch on the head of the staple, and the slide is then retracted to its starting position along with other operating parts of the machine, the plate 194 on the driver-operating lever 174 being carried by this movement into position for the latch 192 to reengage it.

After the shoe has thus been operated upon in one location, the operator moves it along to present a different portion of the upper to the action of the upper-pulling and fastening mechanisms. Alternatively, if it is desired at any portion of the shoe to use the machine to drive and anchor a staple without pulling the upper, the operator effects this result by use of the controlling means fully described in Letters Patent No. 1,796,451. At any time when it is desired to alter the degree of curvature of the staple legs in operating on a shoe this can be quickly accomplished by movement of the lever 226 to the position determined by the stop 232 or by the notch 229.

It will be evident that when the staples are driven and anchored in the manner hereinbefore described, the pull or strain of the lasted upper thereon, which is principally in a direction outwardly toward the edge of the insole, tends to turn each staple about the axis of curvature of its legs in the same direction in which the legs were deflected or curved in the driving operation, so that the staples maintain a firm hold on the upper by the security of their anchorage in the insole.

Fig. 15 shows a section of a shoe of the through-and-through sewed type, illustrating the relation of the staples $s$ driven and anchored as hereinbefore described to the seam $t$ whereby the outsole is secured to the insole. It will be evident that when the staples are driven and anchored in the manner illustrated, they may be so applied as to penetrate the upper in locations nearer the edge of the insole, without danger that their legs will interfere with the outsole stitches, than if the legs were deflected outwardly toward the edge of the insole to anchor them.

While the invention is illustrated and described with particular reference to the manufacture of shoes in which an outsole is secured as by through-and-through stitches, directly upon the margin of the upper lying parallel to the shoe bottom over an insole, the invention in various aspects, as hereinbefore stated, is not limited in utility to the manufacture of that particular type of shoe, and the term "sole" is accordingly used in many of the claims in a comprehensive sense to include both the insole of certain types of shoes and also that part which in shoes of other types may be the outsole or the only sole with which the shoe is provided. It is to be further understood that in the claims the expression "edge of the sole" is used for convenience to designate that portion of the edge which is nearest to the location where the fastening is inserted.

Novel features of the machine herein disclosed which involve the combination of upper-pulling or shaping means with other parts of the organization are claimed in a divisional application, Serial No. 422,453, filed on January 21, 1930; the novel method of pulling or shaping the upper and fastening it in the manner disclosed is claimed in another divisional application, Serial No. 422,454, filed on January 21, 1930; and the novel method of fastening per se and the product of the method are claimed in still another divisional application, Serial No. 422,452, filed on January 21, 1930.

Having described the invention, what I claim as new and desire to secure by Letters Patent of the United States is:—

1. In a machine of the class described, the combination with shoe-positioning means, of means for fastening the upper of a shoe to the sole, said upper-fastening means comprising a driver movable in a direction inclined outwardly toward the edge of the sole to drive a fastening through the upper and into the sole and a deflector arranged to engage different portions of the fastening successively in the driving operation, before the different respective portions enter the sole, to curve them inwardly away from the edge of the sole.

2. In a machine of the class described, the combination with shoe-positioning means, of means for fastening the upper of a shoe to the sole, said upper-fastening means comprising mechanism for driving a staple through the upper and into the sole with its cross-bar extending lengthwise of the edge of the sole and for anchoring the staple by curvature of its legs substantially throughout their lengths in directions leading inwardly away from the edge of the sole.

3. In a machine of the class described, the combination with shoe-positioning means, of means for fastening the upper of a shoe to the sole, said upper-fastening means comprising mechanism for driving a staple through the upper and into the sole with its cross-bar extending lengthwise of the edge of the sole and a deflector arranged to engage the legs of the staple before they enter the sole and during the drive to deflect them in curved paths leading inwardly away from the edge of the sole.

4. In a machine of the class described, the combination with shoe-positioning means, of means for fastening the upper of a shoe to the sole, said upper-fastening means comprising a staple-guiding nozzle arranged to point outwardly toward the edge of the sole, a driver for driving a staple from said nozzle, and a deflector at the outlet end of said nozzle for engaging the legs of the staple before they enter the shoe and during the drive to deflect them in curved paths leading inwardly away from the edge of the sole.

5. In a machine of the class described, the combination with shoe-positioning means, of means for fastening the upper of a shoe to the bottom face of the sole near the edge of the shoe bottom, said upper-fastening means comprising a driver movable in a direction inclined outwardly over the shoe bottom toward said edge of the shoe bottom to drive a fastening through the upper and into the sole.

6. In a machine of the class described, the combination with shoe positioning means, of a nozzle guide for fastenings and a deflector movable together inwardly over the bottom of a shoe into position for fastening the upper to the sole adjacent to one side of the shoe, and a driver movable in a direction inclined outwardly over the shoe bottom toward the adjacent side of the shoe to drive a fastening through the upper and into the sole, said deflector being arranged to curve the fastening progressively in the driving operation in a direction leading inwardly away from said adjacent side of the shoe to anchor it.

7. In a machine of the class described, the combination with shoe-positioning means, of upper-fastening mechanism comprising a driver, a nozzle guide and a deflector movable together inwardly over the bottom of a shoe into position for fastening the upper to the sole adjacent to one side of the shoe, said driver being movable thereafter in a direction inclined outwardly toward the adjacent side of the shoe to drive a fastening through the upper and into the sole, and the deflector being arranged to curve the fastening progressively in the driving operation in a direction leading inwardly away from said adjacent side of the shoe to anchor it.

8. In a machine of the class described, the combination with means for positioning a shoe bottom upward with one side thereof facing forwardly toward the operator's working position and the other side facing rearwardly, of upper-fastening mechanism comprising a driver movable in a rearwardly inclined direction to drive a fastening through the upper and into the bottom of the sole in a location adjacent to the rearwardly facing side of the shoe.

9. In a machine of the class described, the combination with means for positioning a shoe bottom upward with one side thereof facing forwardly toward the operator's working position and the other side facing rearwardly, of upper-fastening mechanism comprising a driver movable in a rearwardly inclined direction to drive a fastening through the upper and into the bottom of the sole in a location adjacent to the rearwardly facing side of the shoe, and a deflector arranged to engage the fastening before it enters the shoe and during the drive to curve it forwardly away from the rearwardly facing side of the shoe for anchoring it in the sole.

10. In a machine of the class described, the combination with means for positioning a shoe bottom upward with one side thereof facing forwardly toward the operator's working position and the other side facing rearwardly, of a staple-guiding nozzle movable forwardly over the bottom of the shoe into position for fastening the upper to the sole in a location adjacent to the rearwardly facing side of the shoe, a staple driver movable in a rearwardly inclined direction to drive a staple from said nozzle through the upper and into the sole, and mechanism automatically operative in the forward movement of said nozzle to form a staple with its legs directed rearwardly preparatory to the operation of the staple driver thereon.

11. In a machine of the class described, the combination with means for positioning a shoe bottom upward with one side thereof facing forwardly toward the operator's working position and the other side facing rearwardly, of a staple-guiding nozzle movable forwardly over the bottom of the shoe into position for fastening the upper to the sole in a location adjacent to the rearwardly facing side of the shoe, a staple driver movable in a rearwardly inclined direction to drive a staple from said nozzle through the upper and into the sole, and staple-forming mechanism comprising an inside former movable forwardly with said nozzle and a relatively stationary outside former arranged to form a staple with its legs directed rearwardly preparatory to the operation of the staple driver thereon.

12. In a machine of the class described, the combination with means for positioning a shoe bottom upward with one side thereof facing forwardly toward the operator's working position and the other side facing rearwardly, of a staple-guiding nozzle movable forwardly over the bottom of the shoe into position for fastening the upper to the sole in a location adjacent to the rearwardly facing side of the shoe, a staple driver movable in a rearwardly inclined direction to drive a staple from said nozzle through the upper and into the sole, and automatic means for forming the staple in a location out of the path of movement of said driver with the legs of the staple directed rearwardly and for transferring the staple into position to be driven.

13. In a machine of the class described, the combination with means for positioning a shoe bottom upward with one side thereof facing forwardly toward the operator's working position and the other side facing rearwardly, of a staple-guiding nozzle movable forwardly over the bottom of the shoe into position for fastening the upper to the sole in a location adjacent to the rearwardly facing side of the shoe, a staple driver movable in a rearwardly inclined direction to drive a staple from said nozzle through the upper and into the sole, staple-forming means comprising an inside former movable forwardly with said nozzle and a relatively stationary outside former arranged to form the staple in a location out of the path of movement of the driver with its legs directed rearwardly, and a member separate from said inside and outside formers for transferring the staple into the path of movement of the driver.

14. In a machine of the class described, the combination with work-positioning means, of a staple-guiding nozzle movable into position over the work, a driver movable in a downwardly inclined direction to drive a staple from said nozzle into the work, staple-forming mechanism automatically operative in the movement of said nozzle to form a staple in a location above the path of movement of the driver, and a member separate from said forming mechanism for transferring the staple downwardly into said path.

15. In a machine of the class described, the combination with work-positioning means, of a staple-guiding nozzle movable into position over the work, a driver movable in a downwardly inclined direction to drive a staple from said nozzle into the work, staple-forming mechanism comprising an inside former and an outside former relatively movable to form a staple above the path of movement of said driver, and a member movable between said inside and outside formers to transfer the staple downwardly into said path.

16. In a machine of the class described, the combination with work-positioning means, of a staple-guiding nozzle movable into position over the work, a driver movable in a downwardly inclined direction to drive a staple from said nozzle into the work, staple-forming mechanism comprising an inside former and an outside former relatively movable to form a staple above the path of movement of said driver, one of said formers being extended downwardly to the path of movement of the driver to guide each staple from forming position to driving position, and a member movable to transfer the staple.

17. In a machine of the class described, the combination with a work rest for engaging work in the hands of an operator, of a driver movable in a direction inclined rearwardly away from the operator's working position to drive a fastening into the work, and deflecting means arranged to engage the fastening before it enters the work and during the drive to deflect it forwardly toward the operator's working position for anchoring it in the work.

18. In a machine of the class described, the combination with a work rest for engaging work in the hands of an operator, of a driver movable in a direction inclined rearwardly away from the operator's working position to drive a staple into the work, and automatic means for forming a staple in a position with its legs directed rearwardly preparatory to the operation of the driver thereon.

19. In a machine of the class described, the combination with a work rest for engaging work in the hands of an operator, of a driver movable in a direction inclined rearwardly away from the operator's working position to drive a staple into the work, and automatic means for forming a staple in a location out of the path of movement of said driver with the legs of the staple directed rearwardly and for thereafter transferring the staple into said path.

20. In a machine of the class described, the combination with a work rest for engaging work in the hands of an operator, of a staple-guiding nozzle movable forwardly toward the operator's working position preparatory to the driving of a staple into the work, a driver movable in a rearwardly inclined direction to drive a staple from said nozzle into the work, and automatic means comprising an inside former movable forwardly with said nozzle and a relatively stationary outside former arranged to form a staple with its legs directed rearwardly preparatory to the operation of the driver thereon.

21. In a machine of the class described, the combination with a work rest for engaging work in the hands of an operator, of a driver movable in a direction inclined rearwardly away from the operator's working position to drive a staple into the work, automatic means comprising co-operating inside and outside formers for forming a staple in a position above the path of movement of the driver with its legs directed rearwardly preparatory to the operation of the driver thereon, and a member movable to transfer the staple from forming position to driving position.

22. In a machine of the class described, the combination with a work rest for engaging work in the hands of an operator, of a staple-guiding nozzle movable in a forwardly and downwardly inclined direction toward the work, a driver movable in a direction inclined rearwardly at an angle to the direction of movement of said nozzle to drive a staple, mechanism automatically operative in the forward movement of said nozzle to form a staple in a plane parallel to the direction of said forward movement, and means for transferring the staple from said plane into a plane parallel to the direction of movement of the driver before the operation of the driver thereon.

23. In a machine of the class described, mechanism for forming a staple in a predetermined plane, a driver movable in a direction at an angle to said plane to drive the staple, and means for transferring the staple from forming position to driving position comprising a member movable in a straight path to engage the staple and tip it from the plane in which it is formed into a plane parallel to the direction of movement of the driver.

24. In a machine of the class described, the combnation with a staple nozzle, and a driver for driving a staple from said nozzle, of a flexible spring metal member having a portion arranged to lie between the legs of the staple at the outlet end of said nozzle and extending lengthwise along said legs to guide the legs in the driving operation, said member being displaceable through its flexibility in response to engagement of the driver therewith.

25. In a machine of the class described, a nozzle for fastenings, a driver, and a deflector having a deflecting face spaced from the outlet end of said nozzle for engaging each fastening before it enters the work and during the drive to deflect it in a curved path for anchoring it in the work, said nozzle and deflector being so constructed and arranged as to provide a continuous wall at one side of the fastening between the end of the nozzle and said deflecting face to prevent the fastening from being deflected in a wrong direction.

26. In a machine of the class described, a staple nozzle, a staple driver, and a deflector having a deflecting face spaced from the outlet end of said nozzle for engaging the legs of each staple before they enter the work and during the drive to deflect them in curved paths for anchoring them in the work, said deflector having a projection thereon arranged to overlie a portion of the staple nozzle to provide a continuous wall at one side of the staple between the end of the nozzle and said deflecting face to prevent the staple legs from being deflected in a wrong direction.

27. In a machine of the class described, the combination with a work rest for engaging work in the hands of an operator, of a driver movable in a direction inclined rearwardly away from the operator's working position to drive a fastening into the work, and a pair of levers, one connected to the driver and the other arranged to operate the first lever, for imparting operative movement to the driver.

28. In a machine of the class described, the combination with a work rest for engaging work in the hands of an operator, of a driver movable in a direction inclined rearwardly away from the operator's working position to drive a fastening into the work, a lever arranged to operate said driver and having a cam slot therein, and a second lever provided with a member engaging the first lever in its cam slot for operating it.

29. In a machine of the class described, the combination with a work rest for engaging work in the hands of an operator, of a driver movable in a direction inclined rearwardly away from the operator's working position to drive a fastening into the work, a pair of levers one having a cam slot therein and the other having a member projecting into said cam slot for operating the driver, and a spring for operating said levers.

30. In a machine of the class described, the combination with means for positioning a shoe bottom upward with one side thereof facing forwardly toward the operator's working position and the other side facing rearwardly, of fastening mechanism comprising a driver movable in a rearwardly inclined direction to drive a fastening into the bottom of the shoe, a driver-operating lever connected to said driver and having a cam slot therein, and a second spring-operated lever having a member engaging the first lever in its cam slot for operating it.

31. In a machine of the class described, the combination with means for positioning a shoe bottom upward with one side thereof facing forwardly toward the operator's working position and the other side facing rearwardly, of fastening mechanism movable forwardly into position for driving a fastening into the bottom of the shoe, said fastening mechanism comprising a driver movable in a rearwardly inclined direction to drive the fastening, a lever for operating said driver, a second spring-operated lever for imparting operative movement to the first lever, and means operative in response to the forward movement of the fastening mechanism to retract the spring-operated lever against the resistance of its spring.

32. In a machine of the class described, the combination with means for positioning a shoe bottom upward with one side thereof facing forwardly toward the operator's working position and the other side facing rearwardly, of fastening mechanism comprising a driver movable in a rearwardly inclined direction to drive a fastening into the bottom of the shoe, a slide movable forwardly to carry said driver into operating position, and means carried by said slide for operating the driver comprising a lever having a cam slot therein and a second lever having a member engaging the first lever in its cam slot.

33. In a machine of the class described, a driver for driving fastenings, and means for operating said driver comprising a pair of levers one having a cam slot therein and the other having a member engaging the first lever in its cam slot, a portion of said cam slot being concentric with the axis of said other lever.

34. In a machine of the class described a driver for driving fastenings, a lever having a cam slot therein and connected to said driver for operating it, and a second spring-operated lever having a member engaging the first lever in its cam slot for operating it, said cam slot having a portion at an end thereof concentric with the axis of the second lever.

35. In a machine of the class described, the combination with means for driving fastenings, and deflecting means arranged to engage each fastening at the same side of the work as the driving means to curve different portions of the fastening successively in the driving operation before the different respective portions enter the work, of means adjustable to different predetermined positions to cause different fastenings to be curved in different degrees, and additional means adjustable to vary simultaneously the curvatures predetermined for the different fastenings without altering the ratio between the different degrees of said curvatures.

36. In a machine of the class described, the combination with means for driving fastenings, and deflecting means arranged to engage each fastening at the same side of the work as the driving means to curve different portions of the fastening successively in the driving operation before the different respective portions enter the work, of a member adjustable to vary the degree of curvature of the fastenings, and limiting devices for determining different positions of said member corresponding to different degrees of curvature desired for different fastenings, said limiting devices being adjustable together while maintaining the same relation to each other to vary the curvatures predetermined for the different fastenings without altering the ratio between the different degrees of their curvatures.

37. In a machine of the class described, the combination with means for driving fastenings, and a deflector arranged to engage each fastening at the same side of the work as the driving means to curve different portions of the fastening successively in the driving operation before the different respective portions enter the work, of an eccentric rotatable to adjust said deflector to vary the curvatures of the fastenings, and limiting devices for determining different positions of said eccentric corresponding to different degrees of curvature desired for different fastenings, said limiting devices being adjustable together about the axis of the eccentric without altering their relation to each other.

38. In a machine of the class described, the combination with means for driving staples to fasten the upper of a shoe to the sole, and deflecting means arranged to engage the legs of each staple to curve different portions of the legs successively in the driving operation before the different respective portions enter the shoe to anchor the staple in the sole, of means adjustable to different predetermined positions to cause staples driven in different portions of a shoe to have different degrees of curvature, and means for predetermining said positions, said last-named means being adjustable to vary simultaneously the curvatures predetermined for the different staples without altering the ratio between the different degrees of their curvatures.

39. In a machine of the class described, the combination with means for driving staples to fasten the upper of a shoe to the sole, and a deflector arranged to engage the legs of each staple to curve different portions of the legs successively in the driving operation before the different respective portions enter the shoe to anchor the staple in the sole, of a member rotatable to adjust said deflector to cause staples driven in different portions of a shoe to have different degrees of curvature, and devices for limiting movements of said member to predetermine said different degrees of curvature, said devices being adjustable together around the axis of said member to vary simultaneously the curvatures predetermined for the different staples without altering the ratio between the different degrees of their curvatures.

40. In a machine of the class described, the combination with means for driving staples to fasten the upper of a shoe to the sole, and a deflector arranged to engage the legs of each staple to curve different portions of the legs successively in the driving operation before the different respective portions enter the shoe to anchor the staple in the sole, of an eccentric rotatable to adjust said deflector to vary the curvatures of the staples, a member for turning said eccentric, and devices for determining respectively different positions of said member, said devices being adjustable simultaneously to different positions without altering their relation to each other.

41. In a machine of the class described, the combination with work-positioning means, of fastening mechanism comprising a guiding nozzle and a deflector movable inwardly over the work toward operating position prior to the driving of a fastening, said deflector being arranged to engage different portions of the fastening successively in the driving operation, before the different respective portions enter the work, to curve them out of the line of drive for anchoring the fastening in the work, and means for imparting to said nozzle and deflector in time relation to the driving of the fastening a movement in a different direction from that of their inward movement over the work to position them in closer relation to the work.

42. In a machine of the class described, the combination with work-positioning means, of fastening mechanism comprising a staple-guiding nozzle and a deflector movable inwardly over the work toward operating position prior to the driving of a staple, the deflector being arranged to engage the legs of the staple before they enter the work and during the drive to curve them out of the line of drive for anchoring them in the work, means for imparting to said nozzle and deflector their inward movement over the work, and additional means for imparting to said nozzle and deflector in time relation to the driving of the staple a movement in a different direction from that of their inward movement to position them in closer relation to the work.

43. In a machine of the class described, the combination with work-positioning means, of fastening mechanism comprising a guiding nozzle and a deflector movable in a direction inclined toward the work prior to the driving of a fastening, said deflector being arranged to engage different portions of the fastening successively in the driving operation, before the different respective portions enter the work, to curve them out of the line of drive for anchoring the fastening in the work, and means for imparting to said nozzle and deflector substantially at the end of their movement in said inclined direction a movement in a direction substantially at right angles to the direction of their inclined movement to position them in closer relation to the work.

44. In a machine of the class described, a work rest for engaging work in the hands of an operator and relatively to which the work may be tipped by the operator at different inclinations, fastening mechanism comprising a guiding nozzle and a deflector movable over the work toward operating position prior to the driving of a fastening, said deflector being arranged to engage the fastening before it enters the work and during the drive to curve it out of the line of drive for anchoring it in the work, and means for imparting to said nozzle and deflector at the end of their movement over the work an additional movement in a different direction toward the work to insure that they will be positioned close to the work in the driving of the fastening.

45. In a machine of the class described, a work rest for engaging work in the hands of an operator and relatively to which the work may be tipped by the operator at different inclinations, fastening mechanism comprising a guiding nozzle and a deflector movable toward the work prior to the driving of a fastening, said deflector being arranged to engage the fastening before it enters the work and during the drive to curve it out of the line of drive for anchoring it in the work, means for imparting to said nozzle and deflector a movement toward the work, and additional means for imparting to said nozzle and deflector a further movement toward the work substantially at the end of their first movement to insure that they will be positioned close to the work in the driving of the fastening.

46. In a machine of the class described, the combination with shoe-positioning means, of fastening mechanism movable in a direction inclined toward the bottom face of a shoe preparatory to the driving of a fastening into the shoe bottom, and means for imparting to said fastening mechanism movement in a different direction toward the bottom face of the shoe to position it in closer relation to said face in time relation to the driving of the fastening.

47. In a machine of the class described, the combination with shoe-positioning means, of fastening mechanism mounted for rectilinear positioning movement in a direction inclined toward the bottom face of a shoe preparatory to the driving of a fastening into the shoe bottom, and means for imparting to said fastening mechanism a swinging movement toward the bottom face of the shoe to position it in closer relation to said face in time relation to the driving of the fastening.

48. In a machine of the class described, the combination with shoe-positioning means, of fastening mechanism comprising a driver, a guiding nozzle and a deflector movable together inwardly over the bottom of a shoe preparatory to the driving of a fastening into the shoe bottom, said deflector being arranged to engage the fastening before it enters the shoe and during the drive to curve it out of the line of drive for anchoring it in the shoe, and means for imparting to said fastening mechanism in time relation to the driving of the fastening movement in a different direction from that of its inward movement over the shoe to position it in closer relation to the bottom of the shoe.

49. In a machine of the class described, the combination with shoe-positioning means, of fastening mechanism movable inwardly over the bottom of a shoe preparatory to the driving of a fastening into the shoe bottom, said fastening mechanism comprising staple-driving means movable in a direction inclined to the bottom face of the shoe to drive a staple and also a deflector for engaging the legs of the staple before they enter the shoe and during the drive to deflect them in curved paths for anchoring them in the shoe, and means for imparting to said fastening mechanism in time relation to the driving of the staple a movement in a different direction from that of its inward movement over the shoe to press said deflector firmly against the shoe.

50. In a machine of the class described, the combination with shoe-positioning means, of fastening mechanism mounted for rectilinear movement inwardly over the bottom of a shoe in a direction inclined to the bottom face of the shoe preparatory to the driving of a fastening into the shoe bottom, said fastening mechanism comprising means for driving a staple and also a deflector for engaging the legs of the staple before they enter the shoe and during the drive to deflect them in curved paths for anchoring them in the shoe, and means for imparting to said fastening mechanism in time relation to the driving of the staple a swinging movement to position said deflector in closer relation to the bottom of the shoe.

51. In a machine for driving fastenings into the bottom of a shoe in the hands of an operator, a sole rest arranged to engage the bottom of the shoe and relatively to which the shoe may be tipped by the operator at different inclinations, fastening mechanism arranged to drive a fastening into the bottom of the shoe in a different location from said sole rest, means for moving said fastening mechanism inwardly over the bottom of the shoe preparatory to the driving of the fastening, and additional means for effecting relative movement of said fastening mechanism and the shoe to position the fastening mechanism in closer relation to the bottom of the shoe prior to the driving of the fastening.

52. In a machine for driving fastenings into the bottom of a shoe in the hands of an operator, a sole rest arranged to engage the bottom of the shoe and relatively to which the shoe may be tipped by the operator at different inclinations, fastening mechanism arranged to drive a fastening into the bottom of the shoe in a different location from said sole rest, said fastening mechanism being movable inwardly over the bottom of the shoe preparatory to the driving of the fastening, and means for imparting to said fastening mechanism movement in a different direction from that of its inward movement over the shoe to position it in closer relation to the bottom of the shoe prior to the driving of the fastening.

53. In a machine for driving fastenings into the bottom of a shoe in the hands of an operator, a sole rest arranged to engage the bottom of the shoe and relatively to which the shoe may be tipped by the operator at different inclinations, fastening mechanism arranged to drive a fastening into the bottom of the shoe in a different location from said sole rest, said fastening mechanism including a guiding nozzle movable inwardly over the bottom of the shoe preparatory to the driving of the fastening and also a driver and means for operating it, and mechanism automatically operative independently of said driver-operating means to impart to said nozzle movement in a different direction from that of its inward movement over the shoe to position it in closer relation to the bottom of the shoe in time relation to the driving of the fastening.

54. In a machine for driving fastenings into the bottom of a shoe in the hands of an operator, a sole rest arranged to engage the bottom of the shoe and relatively to which the shoe may be tipped by the operator at different inclinations, fastening mechanism arranged to drive a fastening into the bottom of the shoe in a different location from said sole rest, said fastening mechanism being movable inwardly over the bottom of the shoe preparatory to the driving of the fastening and including a deflector arranged to curve different portions of the fastening successively in the driving operation, before the different respective portions enter the shoe, to anchor the fastening in the shoe, and means for effecting relative movement of the shoe and said fastening mechanism after the inward movement of said mechanism over the shoe has been substantially completed to position said deflector in closer relation to the bottom of the shoe.

55. In a machine for driving fastenings into the bottom of a shoe in the hands of an operator, a sole rest arranged to engage the bottom of the shoe and relatively to which the shoe may be tipped by the operator at different inclinations, fastening mechanism arranged to drive a fastening into the bottom of the shoe in a different location from said sole rest, said fastening mechanism including a deflector arranged to engage different portions of the fastening successively in the driving operation, before the different respective portions enter the shoe, to curve them out of the line of drive for anchoring the fastening in the shoe, means for moving said fastening mechanism inwardly over the bottom of the shoe preparatory to the driving of the fastening, and means for imparting to said fastening mechanism substantially at the end of its inward movement over the shoe a movement in a different direction from that of its inward movement to position said deflector in closer relation to the shoe.

56. In a machine for driving fastenings into the bottom of a shoe in the hands of an operator to fasten the upper to the sole, a sole rest arranged to engage the bottom of the shoe and relatively to which the shoe may be tipped by the operator at different inclinations, upper-fastening mechanism comprising a staple-guiding nozzle and a deflector movable inwardly over the bottom of the shoe preparatory to the driving of a staple through the upper and into the sole, said deflector being arranged to engage the legs of the staple before they enter the shoe and during the drive to curve them out of the line of drive for anchoring them in the sole, and means for imparting to said nozzle and deflector substantially at the end of their inward movement over the shoe movement in a different direction from that of their inward movement to position them in closer relation to the bottom of the shoe.

57. In a machine for driving fastenings into the bottom of a shoe in the hands of an operator to fasten the upper to the sole, a sole rest arranged to engage the bottom of the shoe and relatively to which the shoe may be tipped by the operator at different inclinations, upper-fastening mechanism comprising a staple-guiding nozzle and a deflector movable inwardly over the bottom of the shoe in a direction inclined to the bottom face of the sole preparatory to the driving of a staple through the upper and into the sole, said deflector being arranged to engage different portions of the legs of the staple successively in the driving operation, before the different respective portions enter the shoe, to curve them out of the line of drive for anchoring them in the sole, and means for imparting to said nozzle and deflector in time relation to the driving of the staple movement in a different direction from that of their inward movement over the shoe to position them in closer relation to the bottom of the shoe.

58. In a machine for driving fastenings into the bottom of a shoe in the hands of an operator to fasten the upper to the sole, a sole rest arranged to engage the bottom of the shoe and relatively to which the shoe may be tipped by the operator at different inclinations, upper-fastening mechanism comprising a staple-guiding nozzle and a deflector mounted for rectilinear movement inwardly over the bottom of the shoe preparatory to the driving of a staple through the upper and into the sole, said deflector being arranged to engage the legs of the staple before they enter the shoe and during the drive to curve them out of the line of drive for anchoring them in the sole, means for imparting to said nozzle and deflector their inward movement over the shoe, and additional means automatically operative substantially at the end of such inward movement to impart to said nozzle and deflector swinging movement toward the bottom of the shoe in time relation to the driving of the staple.

59. In a machine of the class described, the combinaton with work-positioning means, of fastening mechanism comprising a guide from which fastenings are driven and also means for engaging different portions of each fastening successively in the driving operation, before the different respective portions enter the work, to impart to the fastening a curvature such as to anchor it in the work, said fastening mechanism being movable in different directions successively to bring it into operative relation to the work.

60. In a machine of the class described, the combination with work-positioning means, of fastening mechanism comprising a guide from which fastenings are driven and also means for engaging different portions of each fastening successively in the driving operation, before the different respective portions enter the work, to impart to the fastening a curvature such as to anchor it in the work, said fastening mechanism being movable toward operative position in a direction inclined to that surface of the work into which the fastening is driven and then in a different direction to bring it into still closer relation to the work.

61. In a machine of the class described, the combination with work-positioning means, of fastening mechanism comprising a guide from which fastenings are driven into the work, said fastening mechanism being movable toward the work in a direction inclined to that surface of the work into which the fastening is driven and then in a different direction to position it in close relation to the work.

62. In a machine for driving fastenings into the bottom of a shoe in the hands of an operator, a sole rest arranged to engage the bottom of the shoe and relatively to which the shoe may be tipped by the operator at different inclinations, fastening mechanism arranged for driving a fastening into the bottom of the shoe in a different location from said sole rest, and means for moving said fastening mechanism inwardly over the bottom of the shoe, the fastening mechanism and the sole rest being relatively movable in a direction different from that of the inward movement of said mechanism over the shoe, prior to the driving of the fastening, to insure that said mechanism will be positioned close to the bottom of the shoe.

63. In a machine of the class described, a sole rest for engaging the bottom of a shoe held by an operator, fastening mechanism arranged for driving a fastening into the bottom of the shoe, and means for moving said fastening mechanism inwardly over the shoe in a direction inclined toward the bottom of the shoe, the fastening mechanism and the sole rest being relatively movable in a direction different from that of the inward movement of said mechanism over the shoe in time relation to the driving of the fastening to insure that said mechanism will be positioned in close relation to the bottom of the shoe.

In testimony whereof I have signed my name to this specification.

GEORGE GODDU.